Sept. 8, 1970     S. W. BARBER ET AL     3,527,711
PROCESS FOR PREPARING RARE EARTH DOPED
LUMINESCENT SILICA GLASS
Original Filed May 25, 1967     4 Sheets-Sheet 1

INVENTORS
STEPHEN W. BARBER
WILLIAM F. NELSON
BY

FIG. 3

United States Patent Office 3,527,711
Patented Sept. 8, 1970

3,527,711
PROCESS FOR PREPARING RARE EARTH DOPED LUMINESCENT SILICA GLASS
Stephen W. Barber and William F. Nelson, Toledo, Ohio, assignors to Owens-Illinois, Inc., a corporation of Ohio
Continuation-in-part of applications Ser. No. 355,248, Ser. No. 355,251, Ser. No. 355,253, Ser. No. 355,407, Ser. No. 355,408, Ser. No. 355,409, Ser. No. 355,421, Ser. No. 355,422, Ser. No. 355,444, Ser. No. 355,445, Ser. No. 355,469, Ser. No. 355,470, and Ser. No. 355,471, all of Mar. 27, 1964, and continuation of application Ser. No. 641,264, May 25, 1967. This application July 1, 1969, Ser. No. 841,690
Int. Cl. C03c *3/06;* C09k *1/54*
U.S. Cl. 252—301.4         14 Claims

ABSTRACT OF THE DISCLOSURE

This invention relates to the preparation of a uniformly coalesced, transparent glass containing at least one selected oxide ingredient to impart suitable characteristics to the glass by uniformly compacting a homogeneous mixture consisting essentially of substantially pure, non-crystalline silica and the selected ingredient and heating the mixture under vacuum. Typical selected ingredients include metal or metalloid oxides especially the rare earths oxides.

---

This application is, a continuation of application Ser. No. 641,264, and a continuation-in-part of our copending U.S. patent applications: Ser. No. 355,444, Ser. No. 355,-253, Ser. No. 355,407, Ser. No. 355,469, Ser. No. 355,-445, Ser. No. 355,251, Ser. No. 355,248, Ser. No. 355,408, Ser. No. 355,470, Ser. No. 355,421, Ser. No. 355,409, Ser. No. 355,471, and Ser. No. 355,422, all filed Mar. 27, 1964 and all now abandoned.

This invention relates to a novel process for preparing novel glass compositions consisting essentially of silica and small effective amounts of at least one selected oxide ingredient.

More particularly, in accordance with this invention, a substantially transparent, uniformly coalesced, homogeneous glass is prepared by uniformly compacting a homogeneous, anhydrous mixture consisting essentially of finely-divided, substantially pure, non-crystalline silica and a small effective amount of at least one glass-modifying oxide ingredient selected to impart desired characteristics to the glass, and then heating the compacted mixture under vacuum at an elevated, non-devitrifying temperature for a period of time sufficient to obtain substantially complete, uniform coalescence and sintering of the mixture.

A wide range of oxide ingredients may be selected for the practice of this invention depending upon the characteristics desired in the glass body.

Typical ingredients include not by way of limitation the oxides of V, Cr, Mn, Fe, Co, Ni, Cu, Sb, Zn, P, B, U, Ti, Zr, Hf, W, Ta, Ag, Au, Pb, Bi, As, and the rare earths.

In accordance with one embodiment of this invention, it is contemplated preparing a novel, substantially transparent, homogeneous, luminescent glass having a luminescence output of high intensity by uniformly compacting a homogeneous, anhydrous mixture consisting essentially of finely-divided, non-crystalline, substantially pure silica and a small effective amount of at least one luminescent oxide activator, and heating the compacted mixture under vacuum at an elevated, non-devitrifying temperature for a period of time sufficient to obtain substantially complete coalescence thereof.

A wide range of luminescent oxide activators or dopants is contemplated herein including not by way of limitation oxides of Sn, Sb, Zn, Ni, V, Mn, U, Cu, Ag, As, and the rare earths.

It has been discovered that compounds of the rare earths are particularly suitable for the practice of this invention. More particularly, it has been found that luminescent glasses of high intensity output may be prepared by using one rare earth selected from lanthanum, cerium, praseodymium, neodymium, samarium, europium, gadolinium, terbium, dysprosium, erbium, thulium, ytterbium, and lutetium alone or in combination with at least one other rare earth selected from lanthanum, cerium, praseodymium, neodymium, samarium, europium, gadolinium, terbium, dysprosium, erbium, thulium, ytterbium, lutetium, and holmium.

Specific rare earth combinations contemplated herein include:

(1) La and at least one member selected from Ce, Pr, Nd, Sm, Eu, Gd, Tb, Dy, Tm, Yb, and Lu.

(2) Ce and at least one member selected from Pr, Nd, Sm, Eu, Gd, Tb, Dy, Ho, Er, Tm, Yb, and Lu.

(3) Pr and at least one member selected from Nd, Sm, Eu, Gd, Tb, Dy, Ho, Er, Tm, Yb, and Lu.

(4) Nd and at least one member selected from Sm, Eu, Gd, Tb, Dy, Ho, Er, Tm, Yb, and Lu.

(5) Sm and at least one member selected from Eu, Gd, Tb, Dy, Ho, Er, Tm, Yb, and Lu.

(6) Eu and at least one member selected from Gd, Tb, Dy, Ho, Er, Tm, Yb, and Lu.

(7) Gd and at least one member selected from Tb, Dy, Ho, Er, Tm, Yb, and Lu.

(8) Tb and at least one member selected from Dy, Ho, Er, Tm, Yb, and Lu.

(9) Dy and at least one member selected from Ho, Er, Tm, Yb, and Lu.

(10) Ho and at least one member selected from Tm, Yb, and Lu.

(11) Er and at least one member selected from Tm, Yb, and Lu.

(12) Tm and at least one member selected from Yb, and Lu.

(13) Yb and Lu.

In accordance with another embodiment of this invention, it is contemplated using a luminescent glass body (prepared by the novel process described hereinbefore) as the target material.

Luminescence is photon emission initiated by energy forms other than thermal agitation. Luminescence of a solid under excitation requires suitable arrangement and population of the electronic energy levels in its constituent atoms: properly situated electrons are excited to higher energy levels under excitation, and emit photons upon their spontaneous return to lower levels. Luminescent materials are used commercially in cathode ray tubes, particularly television picture tubes, X-ray and radar screens, oscilloscopes, electron microscopes, fluorescent lights, radiation detection devices, and luminous markers, signs, and dials.

Luminescence device herein means any apparatus or contrivance in which energizing radiation is converted to luminescence emission; target herein means the material, regardless of shape or form, in a luminescence device which effects this conversion. Cathodoluminescence device and photoluminescence device refer, respectively, to luminescence devices in which the energizing agent is cathode rays or photon radiation. Most present commercial luminescence devices use targets composed of polycrystalline phosphors prepared by sintering powdered inorganic reactants selected to provide the necessary host and activator components. The resultant aggregates are ground or otherwise to a particle size of about one to twenty microns, and then deposited on a substrate. Organic materials are often used as binders to obtain more uniform phosphor deposition, or as membrane coatings for the phosphor to provide a surface which can be aluminized. Several disadvantages attend these processes: comminution adversely affects luminescence efficiency of the phosphors; the phosphors' inherent sensitivity to deterioration by chemical attack is enhanced by their large surface/volume ratio when powdered; uniform contact among phosphor particles and with the substrate is difficult to achieve, and inadequate contact causes light scattering which decreases effective output; phosphor coatings have little abrasion resistance, and binders used in their preparation are subject to thermal deterioration; and, of course, product fabrication techniques are limited to those which do not adversely affect the sensitive phosphor screens. In cathodoluminescence devices the excitation current must be kept below levels, usually low, which damage the phosphor. Also, the screen is usually opaque, and consequently resolution and definition of a projected image are relatively poor. A known process designed to overcome some of these problems involves blending powdered phosphor in a frit, followed by fusion. The phosphor deteriorates under this treatment, however, and the inhomogeneity of the resultant glass causes objectable scattering of emitted light.

The luminescence devices of the present invention overcome many of these disadvantages by employing a target comprising a glass body consisting essentially of silica and a metal or metalloid oxide wherein the oxide is preferably that of rare earth element is described hereinbefore. Broadly, the glass body consists essentially of vitreous silica with small amounts of the aforesaid glass-modifying metal or metalloid oxide, e.g. at least one rare earth oxide, where the number of metal or metalloid atoms per million silicon atoms is from 5 to 5000.

These compositions possess the unique and advantageous properties of vitreous silica, including high chemical durability and low thermal expansion with consequent resistance to thermal shock. The transparency of silica allows transmission of a greater range of exciting radiations than other glasses and most crystals. Its optical transparency in particular allows excellent resolution, definition, and contrast ratio, so that images remain visible at luminosity levels lower than those which are adequate with commercial opaque phosphors; conversely, the vitreous silica host can withstant extremely high current density without damage, allowing cathodoluminescence to achieve high luminosity. The silica-rare earth oxide glasses of this invention possess particularly unique and unexpectedly bright luminescence, especially cathodoluminescence, when excited as hereinafter described.

The vitreous silica-rare earth oxide glass bodies used in the devices of the present invention are prepared by novel procedures which comprise a further aspect of this invention. Prior art methods for perparing vitreous silica and forming objects therefrom can be classified into those which begin with crystalline silica and those which use vitreous silica as a starting material. The formation of vitreous silica from one of its crystalline forms has been carried out by fusion and by sintering. The fusion process requires temperatures above 1710° C., the liquidus of betacristobalite. The resultant melt is difficult to handle. It has a high viscosity which causes it to retain dissolved and entrapped gases tenaciously, a high vapor pressure, and a strong affinity for impurities which enhance an already pronounced endency to devitrify during cooling. For these reasons, properties such as transparency or homogeneity are often sacrificed to avoid the difficulties associated with prolonged high temperature treatments, and the resultant products are allowed to retain partial crystalline character. Thus in the process described in U.S. Pat. 2,958,604, particulate crystalline silica (quartz) on which cerium oxide has been uniformly deposited is heated momentarily to 1750° C. to obtain a fused product which resists darkening on exposure to nuclear radiation. Undoubtedly, the product retains substantial crystalline character, since it has been shown that to obtain truly vitreous silica in which all quartz structure is obliterated, crystalline starting material must be subjected to long exposure to tempeartures of 1800° to 1900° C.; see V. A. Florinskaya and R. S. Pechenkina, Dokl. Akad. Nauk SSSR 85, 1265 (1952). When optically transparent completely vitreous silica is to be prepared from crystalline precursors, fusion must be effected at prolonged high temperatures; a typical process requires temperatures near 1850° C. for eight hours under vacuum, to remove from the melt bubbles which otherwise provide sites for initiation of devitrification during cooling. Known sintering processes for converting crystalline silica to partially vitreous silica involve temperatures of about 1100° to 1700° C. The higher temperatures in this range allow faster glass formation, but incur the problem of cristobalite crystallization, which occurs at 1300° to 1710° C. The difficulties involved in sintering quartz to obtain vitreous silica are discussed at length in U.S. Pat. 2,270,718.

Vitreous silica is available from sources other than its crystalline forms: particulate vitreous silica can be prepared by the hydrolysis or combustion of suitable silicon compounds such as silicon halides and organosilanes. The finely divided material thus obtained can be condensed directly upon a molten surface and immediately fused as described in U.S. Pats. 2,188,121 and 2,272,342. Particulate vitreous silica from these sources or that obtained by grinding fused silica can also be employed to form large vitreous bodies by slip casting techniques which require firing at 1100° to 1260° C. for about one to four hours. The products are translucent or opaque, porous, and partly crystalline; see J. D. Fleming, Am. Ceram. Soc. Bull., 40 (12), 748 (1961). A similar process at slightly higher temperatures (1200° to 1450° C.) has been said to give transparent products (U.S. 2,268,589). Processes which begin with particulate vitreous silica but require temperatures well above the fusion point of betacristobalite are also known: British Patent 524,442 (1940) specifies 1800° to 2100° C.; S. D. Brown, "The Devitrification of High-Temperature Glass" (Thesis, University of Utah, 1957) suggests 1800° to 1900° C. The difficulties expected from silica melts at these temperatures have already been noted.

We have now discovered a method for preparing homogeneous, optically transparent, vitreous silica bodies essentially devoid of crystalline structure and voids, at temperatures well below 1800° C. In particular, we have discovered a method for preparing vitreous luminescent bodies which consist essentially of substantially pure, non-crystalline silica and a relatively lesser portion of at least one metal or metalloid oxide especially a rare earth oxide.

Within the useful concentration range already set forth, e.g. 5 to 5000 atoms of metal or metalloid ion per million silicon atoms, a range of 100 to 2000 atoms is preferred. Concentrations substantially below this range fail to provide a convenient brightness level under energization by readily obtainable means, and concentrations substantially above this level lead to decreased transparency in the product.

In the particular embodiment of this invention wherein the vitreous targets contains two or more metal or metalloid oxide luminescent activators, e.g. rare earth oxides, the concentration of each activator should be at least 5 atoms, preferably at least 50 atoms, with the total concentration of all the activators not exceeding 5000 atoms, preferably less than 2000 atoms.

The vitreous or non-crystalline silica compositions of this invention containing a rare earth oxide have been found to be both cathodoluminescent and photoluminescent; in particular, photoluminescence is obtained when the compositions are energized by ultraviolet rays. For example, in a specific embodiment of this invention, the glasses which contain lanthanum oxide or lanthanum oxide and an oxide of a rare earth selected from praseodymium, cerium, neodymium, samarium, europium, gadolinium, terbium, dysprosium, thulium, ytterbium, and lutetium, are cathodoluminescent, whereas those containing lanthanum oxide or lanthanum oxide and an oxide of a rare earth selected from praseodymium, cerium, neodymium, samarium, europium, gadolinium, terbium, dysprosium, thulium, and ytterbium are photoluminescent.

According to a further embodiment of the invention there are provided vitreous fibers of silica containing a luminescent activator, e.g. a rare earth ovide; and optionally, at least another luminescent activator. In each of those embodiments pertaining to silica fibers, the broad and preferred concentration ranges are as stated hereinbefore.

In a further particular aspect of the invention there are provided glass fibers of the foregoing description wherein the central core of the fiber is as before described, but wherein there is an outer sheath of vitreous silica containing substantially no luminescent activator, or at least containing several orders of magnitude less luminescent activator than in the core.

The foregoing silica glass fibers containing luminescent activators are, of course, also responsive to the same energizing radiations as the bulk glasses, and can thus be used in various luminescence devices. However, the fibers containing the outer covering of vitreous silica cannot be used as cathodoluminescent fibers by bombardment through the silica sheath, since the electrons will not sufficiently penetrate. However, they can be employed by bombardment on the end where the luminescent glass is exposed. The clad fibers, are, however, responsive to ultraviolet radiation, since silica will pass ultraviolet light through the sheath to the core.

According to a specific embodiment of this invention there is provided a process for making luminescent glass there is provided a process for making a transparent, luminescent glass which comprises compacting a homogeneous mixture of finely divided vitreous silica and at least one rare earth oxide wherein the number of rare earth atoms per million silicon atoms is from 5 to 5000, to form a coherent body, and heating the body thus obtained at 1000° C. to 1750° C. for a time of from about one minute to about twenty-four hours. In a usual embodiment silica of particle size one to 5000 millimicrons is used.

The time required to effect glass formation at a given temperature, or the temperature at a set time, decreases with decreased particle size. Also, homogeneous mixture of batch components is more assured when the silica particle size is small. Therefore, in a preferred embodiment, vitreous silica of particle size 10 to 2500 millimicrons is used. In a particularly preferred embodiment, vitreous silica of particle size 10 to 100 millimicrons is used.

Because the temperatures involved in the glass forming procedures of this invention are well below 1800° C., the viscosity of the vitreous material remains high throughout; this prevents significant migration of the rare earth components, and favors their homogeneous distribution in the products already described.

The ability to obviate migration of rare earth components during glass formation also allows formation of physically uniform glasses which contain a sharp boundary between two areas, one of which contains a rare earth not present in the other, by heating two or more pressed bodies of the type already described and which contain different rare earth components, while they are in contact, to form a glass. The boundary can be a plane, or any other shape to which the coherent bodies of this invention can be formed. The resultant glasses are useful as decorative materials since each sharply defined segment of, for example, a rod, can contain a different rare earth or rare earths, and therefore emit a different luminescence emission when excited by energizing radiation. These materials are also useful in devices which require changing target materials rapidly or often.

Retention of high viscosity by the vitreous materials of this invention during formation of the glass bodies herein described also allows preparation of otherwise homogeneous vitreous bodies in which there is a sharp change in concentration of a constituent rare earth across a predetermined boundary, by heating two or more pressed bodies of the type already described and which contain different concentrations of the same rare earth component, while they are in contact, to form a glass. These products are especially useful in applications where luminescence emission of the same wavelength but varying intensity is desired.

The luminescent glass compositions of the present invention are useful as light sources in illuminating devices, signs, markers, etc. The luminescence devices of the present invention are useful as display means, oscilloscopes, etc.

The starting material for the practice of the present invention is finely divided particulate non-crystalline or vitreous silica, usually with a maximum linear dimension of about 5000 millimicrons. This material can be obtained by grinding or otherwise comminuting fused vitreous silica, or by combustion or vapor phase hydrolysis of silicon derivatives, particularly organosilanes and silicon halides. The latter process is preferable, particularly for the smaller particle range, because comminuting to obtain these sizes is laborious, and tends to introduce impurities. The particle size depends upon the heating schedule to be followed and the particular desired properties of the product. Limitations on the use of a certain particle size, temperature, and time to obtain a vitreous, transparent, luminescent product are best established by routine test, and cannot be set forth for all possible combinations.

Preliminary treatment of the particulate vitreous silica to remove water nad organic impurities is conveniently carried out by heating at 700° C. for about twelve hours, followed by about two hours at 1000° C., both steps optionally being carried out in a vacuum. Firing at 700° C. removes about 90% of the water and, if in air, organic material, firing at 1000° C. removes most of the remaining water. Water thus removed is that which is present as chemisorbed water, i.e., as silicon-bonded hydroxyl groups on the surface of the starting material. Although the anhydrous particulate silica thus obtained is subsequently contacted with water, as discussed below, rehydration by chemisorption is so slow that it does not take place under the conditions used; see A. C. Makrides and N. Hackerman, J. Phys. Chem. 63, 594 (1959).

The substantially anhydrous material obtained from the drying procedure is treated with about 10 ml. of water per gram of silica to obtain a slurry or paste which can be compacted. The liquid used need not be water, since it is removed at a subsequent step, and serves merely as a medium in which to manipulate the silica; other liquids such as alcohol and acetone can be used with suitable modification of subsequent steps. The homogeneous addition of the small amounts of the oxide ingredient source to the silica is conveniently carried out at this step. The oxide source can be added in a form which is soluble in the liquid used, and subsequently precipitated in the paste, thereby assuring homogeneous distribution in the final product. When water is used to prepare the slurry, selected salts in aqueous solution can be added, and the oxide or hydroxide thereof precipitated by addition of base. The salt and precipitant should be selected so that by-products from precipitation are volatilized during subsequent heating.

The paste thus obtained is next evaporated to dryness, at about 100° C. or slightly more when water is the continuous phase, to give a more dense material than the original anhydrous powder. The compressed material is pulverized by any convenient means, usually by mortar and pestle or a ball mill. To retain highest purity, the abrasive surfaces should be of alundum or silica. The pulverized material is fired at about 700° C. in air to remove organic impurities which may have been re-introduced since the initial purification, and to complete removal of the added water or other dispersing medium. Temperatures substantially above 700° C. should not be exceeded, since premature coalescence of the particles can occur. Usually about thirty minutes at 700° C. is adequate, with increasing time for larger quantities. The resultant dried powder is next treated with about two or three drops of water or other suitable liquid per gram to increase cohesion of the particles. The dampened powder is then formed by pressing, usually in a stainless steel or platinum mold for highest purity. Only about 100 p.s.i.g. is required for forming, although higher pressures can be used. Care should be taken that compacting is relatively uniform through the mass so the surface does not seal during subsequent firing, leaving bubbles in the interior of the body. The pressed forms can be left in the die during subsequent firing or removed if desired. The pressed forms are next subjected to temperatures of about 700° C. under a vacuum of about $10^{-4}$ mm. of mercury. The temperature is slowly increased to about 1250° C., where it is maintained for about thirty to sixty minutes. The time at 1250° C. depends upon the particular size used. In general, heating should be discontinued when the pressed form has shrunk about 40% along each linear dimension, and before the surface has a glazed appearance. The purpose of the vacuum is principally to avoid trapping bubbles and to keep the glass in its essentially anhydrous condition. The final coalescence is next carried out at temperatures up to 1750° C. in a vacuum conveniently maintained at about $10^{-1}$ mm. of mercury. The time required for complete coalescence varies with the temperature used, usually from about twenty-four hours at lower temperatures to about three minutes at temperatures near 1750° C. The products thus obtained are vitreous, that is, they are substantially devoid of crystalline structure.

As used herein, the term "substantially pure" silica means silica which is at least 99 weight percent pure.

The silica used in the following examples had a particle size of 10 to 20 millimicrons and is designated Cab-O-Sil "O," and can be obtained from Godfrey L. Cabot, Inc., Boston, Mass.; the manufacturer gives the composition on a total weight basis as:

|  | Percent |
|---|---|
| $Al_2O_3$ | 0.010 |
| $Fe_2O_3$ | 0.001 |
| $TiO_2$ | 0.001 |
| CuO-MgO | 0.000 |
| $Na_2O$ | 0.020 |
| $SiO_2$ (by difference) | 99.968 |

The various aspects of the invention will now be illustrated with lanthanum oxide and it is to be understood that the other rare earth oxides can be used in place thereof as described and illustrated in the thirteen (13) parent applications listed hereinbefore under related applications. Likewise, other glass modifying ingredients may be substituted.

Example 1

This example describes preparation of transparent, luminescent, silica glasses containing lanthanum oxide.

(A) Vitreous silica of particle size 10 to 20 millimicrons was heated at 700° C. for twelve hours and then at 1000° C. for about two hours. The material thus obtained was mixed with aqueous lanthanum nitrate in a ratio of 10 ml. of solution per gram of silica, and a solute concentration selected to provide 5 lanthanum atoms per million silicon atoms. Aqueous ammonia was added to precipitate lanthanum oxide on the surface of the silica, and the resultant mixture was evaporated to dryness at 100° C. The residue was ground with a mortar and pestle, and the powder thus obtained was first heated at 700° C. for thirty minutes, and then mixed with two drops of water per gram of solid. The resultant material was pressed in a platinum die at 100 p.s.i.g. to form a coherent cylinder about 5/8 inch in diameter and 3/8 inch high. The pressed form was dried at about 100° C., and then heated at 1250° C. until the cylinder had shrunk about 40% along each linear dimension. The product thus obtained was placed in the closed end of a vitreous silica tube, whose interior was kept under vacuum, and this assembly was heated at 1750° C. for three minutes, whereupon the silica tube collapsed around the cylinder as coalescence occurred to give a transparent, luminescent glass of silica and lanthanum oxide. The luminescent glass thus obtained is surrounded by an envelope of pure vitreous silica; the envelope is readily removed, if necessary, by grinding.

(B) The procedure of Example 1(A) was repeated, except that a concentration of 100 lanthanum atoms per million silicon atoms and a final coalescence temperature of 1600° C. for ten minutes were substituted for the conditions therein described; the product was a transparent, luminescent glass.

(C) The procedure of Example 1(A) was repeated, except that a concentration of 200 lanthanum atoms per million silicon atoms and a final coalescence temperature of 1500° C. for forty minutes were substituted for the conditions therein described; the product was a transparent, luminescent glass.

(D) The procedure of Example 1(A) was repeated, except that a concentration of 2000 lanthanum atoms per million silicon atoms and a final coalescence temperature of 1400° C. for nine hours were substituted for the conditions therein described; the product was a luminescent glass.

Example 2

This example describes preparation of transparent, luminescent, silica glasses containing lanthanum oxide, and another rare earth oxide.

The procedure of Example 1(A) was repeated, except that the aqueous lanthanum nitrate therein described was replaced with aqueous lanthanum nitrate and praseodymium nitrate in a concentration of solutes selected to provide 10 rare earth atoms per million silicon atoms; the product was a transparent, luminescent glass. The procedure of Examples 1(A)–(D) can also be adopted by suitable changes apparent to those skilled in the art to provide transparent, luminescent glasses of silica, lanthanum oxide and neodymium oxide; silica, lanthanum oxide, and samarium oxide; silica, lanthanum oxide, and europium oxide; silica, lanthanum oxide, and gadolinium oxide; silica, lanthanum oxide, and terbium oxide; silica, lanthanum oxide, and dysprosium oxide; silica, lanthanum oxide, and thulium oxide; silica, lanthanum oxide, and ytterbium oxide; and silica, lanthanum oxide, and lutetium oxide, wherein there are 100, 2000, or 5000 rare earth atoms per million silicon atoms and at least 5 lanthanum atoms per million silicon atoms.

Example 3

This example describes preparation of luminescence devices from glasses made according to Examples 1 and 2.

(A) Samples of glasses prepared according to Examples 1 and 2 were employed as target materials and irradiated with ultraviolet light filtered to obtain wavelengths of 2537 A. and 3660 A. Under these conditions, glasses which contained lanthanum and optionally another rare earth gave the following results: lanthanum, weak green luminescence at the shorter wavelength; lanthanum-praseodymium, red luminescence of bright intensity at the shorter wavelength and infrared emission; lanthanum-neodymium, infrared emission; lanthanum-samarium, light pink luminescence of weak intensity at the shorter wavelength, blood red luminescence of weak intensity at the longer wavelength, and infrared emission; lanthanum-europium, light red luminescence of medium intensity at the shorter wavelength, pink luminescence of medium intensity at the longer wavelength, and infrared emission; lanthanum-gadolinium, ultra-violet emission; lanthanum-terbium, light green luminescence of bright intensity at the shorter wavelength, and greenish luminescence of very weak intensity at the longer wavelength; lanthanum-dysprosium, light yellow luminescence of weak intensity at the shorter wavelength, yellow luminescence of very weak intensity at the longer wavelength, and infrared emission; lanthanum-thulium, dark blue luminescence of very weak intensity at the longer wavelength, and infrared emission; lanthanum-ytterbium, infrared emission.

(B) Samples of glasses prepared according to Examples 1 and 2 were employed as target materials and bombarded with cathode rays. Under these conditions, the glasses which contained lanthanum or lanthanum and another rare earth gave the following results: lanthanum, dark blue luminescence of weak intensity; lanthanum-praseodymium, dark red luminescence of medium intensity and infrared emission; lanthanum-neodymium, infrared emission; lanthanum-samarium, red luminescence of bright intensity and infrared emission; lanthanum-europium, orange luminescence of weak intensity and infrared emission; lanthanum-gadolinium, ultraviolet emission; lanthanum-terbium, blue green luminescence of very bright intensity; lanthanum-dysprosium, yellow luminescence of bright intensity, and infrared emission; lanthanum-thulium, dark blue luminescence of medium intensity, and infrared emission; lanthanum-ytterbium, infrared emission; lanthanum-lutetium, ultraviolet emission.

Example 4

This example describes the preparation of a transparent, luminescent glass of silica and rare earth oxides, which possesses several boundaries on one side of each of which the glass contains a rare earth not present on the other side.

Vitreous silica of particle size 10 to 20 millimicrons was heated at 700° C. for twelve hours and then at 1000° C. for about two hours. The material thus obtained was mixed with aqueous lanthanum nitrate in a ratio of 10 ml. of solution per gram of silica, and a solute concentration selected to provide 100 lanthanum atoms per million silicon atoms. Aqueous ammonia was added to precipitate lanthanum oxide on the surface of the silica, and the resultant mixture was evaporated to dryness at 100° C. The residue was ground with a mortar and pestle, and the powder thus obtained was first mixed with two drops of water per gram of solid. The resultant material was pressed in a platinum die at 100 p.s.i.g. to form a coherent cylinder about 5/8 inch in diameter and 3/8 inch high, here designated Sample A. The following samples were similarly prepared, substituting the designated rare earths for the lanthanum of Sample A: Sample B, 200 atoms of samarium per million silicon atoms; Sample C, 150 atoms of lutetium per million silicon atoms; Sample D, 100 atoms of lanthanum and 100 atoms of praseodymium per million silicon atoms. The pressed form was dried at about 100° C., and then heated at 1250° C. until the cylinder had shrunk about 40% along each linear dimension. The samples thus obtained were stacked in alphabetical order in a vitreous silica tube, and the tube, whose interior was kept under vacuum, was heated at 1750° C. for three minutes, whereupon the silica tube collapsed around the cylinders as coalescence occurred to give a transparent, luminescent glass which was physically homogeneous and had sharp boundaries between successive regions containing lanthanum; samarium; neodymium and lutetium; and lanthanum and praseodymium.

Example 5

This example describes the preparation of a transparent, luminescent glass of silica containing lanthanum oxide, which possesses several boundaries on one side of which the concentration of lanthnum is different from that on the other side.

By the procedure of Example 4, a series of five samples was prepared containing, respectively, 5, 100, 200, 300, and 400 lanthanum atoms per million silicon atoms. The resultant samples were coalesced as described in the cited example to give a transparent, luminescent glass which was physically homogeneous and had sharp boundaries between successive regions containing lanthanum in the cited concentrations.

In particular, the luminescence spectra of the silica-lanthanum oxide glasses of this invention show a broad continuum from about 400 to about 520 nm. (nanometers). The spectra of the silica glasses of this invention which contain lanthanum oxide and other rare earth oxide display this continuum and, superimposed thereon, maxima at the following principal wavelengths; the term in parentheses is an approximation of relative intensity: lanthanum-praseodymium 1090 nm. (medium), 910 nm. (strong), 860 nm. (strong), 722 nm. (weak), 708 nm. (weak), 656 nm. (strong), 635 nm. (strong), 612 nm. (strong), 592 nm. (weak), 490 nm. (weak); lanthanum-neodymium, 890 nm. (strong), 907 nm. (medium) 1010 nm. (weak); lanthanum-samarium, 566 nm. (strong), 578 nm. (weak), 605 nm. (strong), 651 nm. (strong), 663 nm. (medium); lanthanum-europium 617 nm. (strong), 629 nm. (medium), 657 nm. (medium), 700 nm. (weak); lanthanum-gadolinium 325 nm. (weak), 316 nm. (strong), 314 nm. (strong), 313 nm. (medium), 311 nm., 308 nm., 306 nm. (weak); lanthanum-terbium 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.; lanthanum-dysprosium 582 nm., 602 nm. (strong), 669 nm., 671 nm., 678 nm., (medium), 758 nm. (strong), 870 nm. (weak); lanthanum-thulium 458 nm., 461 nm., 464 nm. (strong), 787 nm.; lanthanum-ytterbium 986 nm. (medium), 1040 nm. (weak); lanthanum-lutetium ca. 450 nm.

Example 6

(A) The procedure of Example 1(A) was repeated, except that praseodymium nitrate, neodymium nitrate, samarium nitrate, gadolinium nitrate, europium nitrate, terbium nitrate, dysprosium nitrate, holmium nitrate, erbium nitrate, thulium nitrate, ytterbium nitrate, or lutetium nitrate was used in place of the lanthanum nitrate. A transparent, luminescent glass of silica and the rare earth oxide was formed in each instance. The luminescent glass thus obtained is surrounded by an envelope of pure vitreous silica; the envelope is readily removed, if necessary, by grinding.

(B) The procedure of Example 6(A) was repeated except that a concentration of 100 of the aforesaid rare earth oxides per million silicon atoms and a final coalescence temperature of 1600° C. for ten minutes were substituted for the conditions therein described; the product was a transparent, luminescent glass.

(C) The procedure of Example 6(A) was repeated, except that a concentration of 200 of the aforesaid rare earth oxides per million silicon atoms and a final coalescence temperature of 1500° C. for forty minutes were substituted for the conditions therein described. The product was a transparent, luminescent glass.

(D) The procedure of Example 6(A) was repeated, except that a concentration of 2000 of the aforesaid rare earth oxides per million silicon atoms and a final coalescence temperature of 1400° C. for nine hours were substituted for the conditions therein described. The product was a luminescent glass.

Example 7

The procedure of Example 1(A) was repeated for each of the following aqueous mixtures which were substituted for the aqueous lanthanum nitrate, and a transparent, luminescent silica glass was obtained in each instance; praseodymium nitrate and neodynium nitrate; neodynium nitrate and samarium nitrate; samarium nitrate and europium nitrate; europium nitrate and gadolinium nitrate; gadolinium nitrate and terbium nitrate; terbium nitrate and dysprosium nitrate; dysprosium nitrate and holmium nitrate; holmium nitrate and thulium nitrate; erbium nitrate and thulium nitrate; thulium nitrate and ytterbium nitrate; ytterbium nitrate and lutetium nitrate. The concentration of solutes was selected to provide 10 rare earth atoms per million silicon atoms. The product was a transparent luminescent glass.

The procedure of Examples 1(A)–1(D) can also be adapted by suitable changes apparent to those skilled in the art to provide transparent, luminescent glasses of silica plus at least two of the aforesaid rare earth oxides.

Example 8

(A) Samples of glasses prepared according to Examples 6 and 7 were employed as target materials and irradiated with ultraviolet light filtered to obtain wavelengths of 2537 A. and 3660 A. Various results were noted, depending upon the particular rare earth oxides present in the glass.

(B) Samples of glasses prepared according to Examples 6 and 7 were employed as target materials and bombarded with cathode rays. Again, different results were noted with respect to each glass, depending upon the composition thereof.

Figure 1:
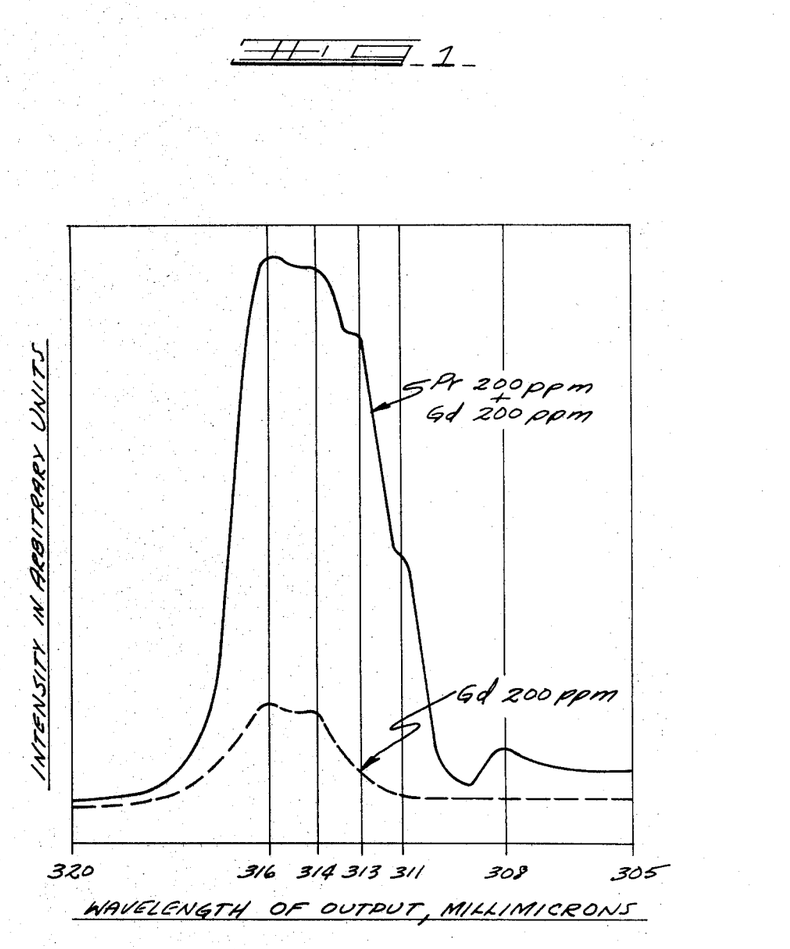

The silica glasses of this invention which contain praseodymium oxide and gadolinium oxide possess remarkable and unexpected properties. When these glasses are excited with ultraviolet radiation of wavelength 2537 A. the emission spectrum of gadolinium is markedly enhanced. Quantitative intensity measurements are difficult, but it is estimated that the presence of praseodymium multiplies the intensity of gadolinium luminescence by at least a factor of five. FIG. 1 shows a trace which compares the spectra obtained from glasses which contain gadolinium but not praseodymium (lower curve) and glasses which contain gadolinium and praseodynium (upper curve). The ordinate is proportionate to intensity of emission under the same concentrations and excitation conditions for each glass; it is apparent that the presence of praseodymium causes substantial increase in brightness of luminescence emission. The cause of this synergistic enhancement of gadolinium emission by praseodymium is unknown.

The present invention also provides new, substantially homogeneous glasses of silica containing europium oxide and terbium oxide which possess remarkable and unexpected selective enhancement of the luminescence from certain electronic energy levels in terbium. Thus according to this aspect of the invention, addition of terbium and adjustment of the europium and terbium concentrations of the silica glasses heretofore described can be used to enhance selectively certain wavelengths of terbium emission while others are substantially unaffected, and emission from europium is decreased. The causes of this behavior are unknown. A suitable rare earth concentration range for the silica glasses of this invention containing terbium oxide and europium oxide is from about 5 to about 5000 rare earth atoms per million silicon atoms, and at least 5 europium atoms per million silicon atoms.

Figure 2:
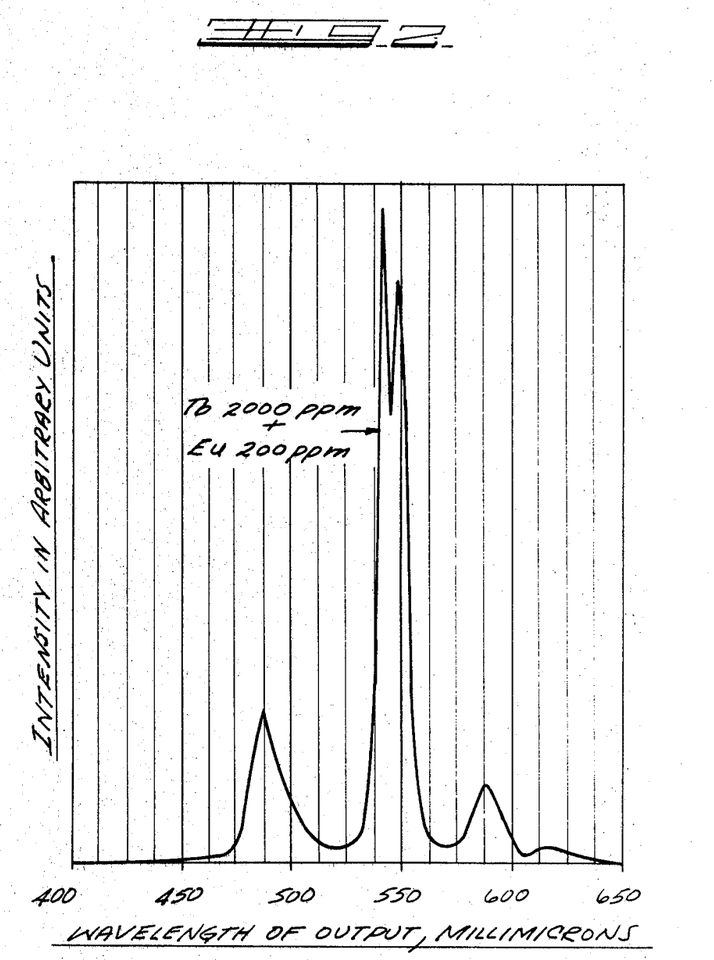

The unusual and unexpected enhancement of certain terbium emission wavelengths in the presence of europium is shown in FIG. 2, which is a trace of the luminescence spectrum of a glass of this invention containing 2000 terbium atoms and 200 europium atoms per million silicon atoms, excited by 3660 A. ultraviolet irradiation; abscissa units are nanometers. Since neither glasses containing europium but not terbium, nor those containing terbium but not europium gave measurable spectra under similar excitation conditions, it is apparent that a marked and unexpected enhancement of luminescence is provided by glasses containing both of these rare earths. The causes of this synergistic effect are unknown.

The present invention also provides new, substantially homogeneous glasses of silica containing europium oxide and lutetium oxide which are remarkable and unexpected in that they possess luminescence emission spectra of unusual and unpredictable wavelengths and intensities. Thus, according to this aspect of the invention, addition of lutetium and europium can be used to provide a silica glass containing europium oxide and lutetium oxide which shows under suitable excitation a broad emission continuum of high intensity from about 400 nm. to about 650 nm. (nanometers); this type of emission is not characteristic of either europium or lutetium in the absence of one another. The causes of this synergistic effect are unknown.

Figure 3:
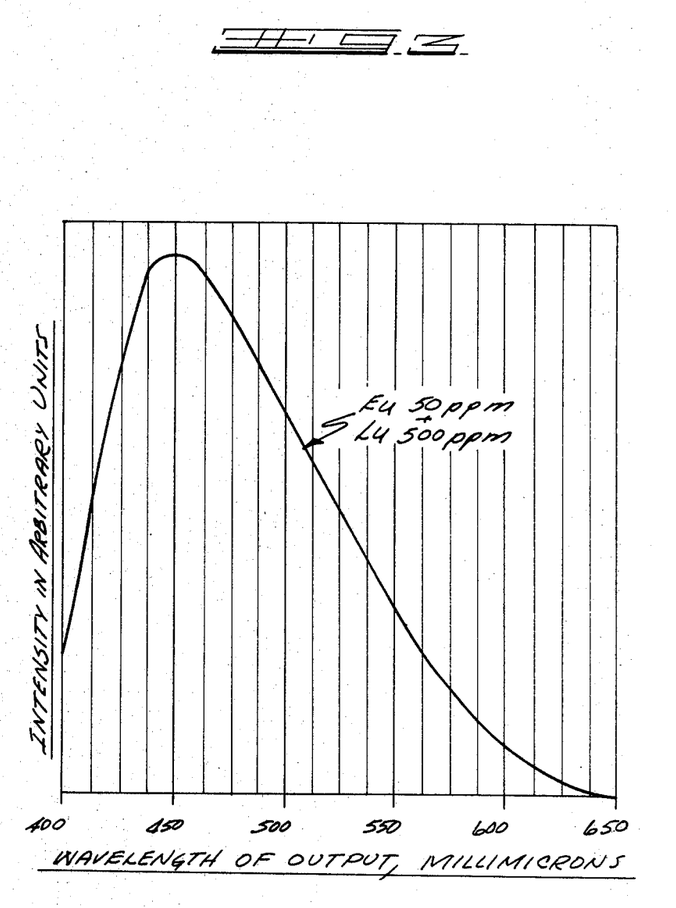

The unusual and unexpected spectra characteristic of the silica glasses of this invention containing europium and lutetium are represented in FIG. 3, which is a trace of the luminescence spectrum of a glass of this invention containing 100 europium atoms and 100 lutetium atoms per million silicon atoms, excited by 3600 A. ultraviolet irradiation; abscissa units are nanometers. Since neither glasses containing europium but not lutetium, nor those containing lutetium but not europium gave measurable spectra under similar excitation conditions, it is apparent that a marked and unexpected enhancement of luminescence is provided by glasses containing both of these rare earths. Also, the shape of the curve is not attributable to either rare earth. The causes of this synergistic effect are unknown.

The present invention also provides new, substantially homogeneous glasses of silica containing terbium oxide and cerium oxide which possess remarkable and unexpected selective enhancement of the luminescence from certain electronic energy levels in terbium. Thus according to this aspect of the invention, addition of cerium and adjustment of the cerium and terbium concentrations of the silica glasses heretofore described can be used to enhance selectively certain wavelengths of terbium emission while others are substantially unaffected, and emission from cerium is decreased. The causes of this behavior are unknown. A suitable rare earth concentration range for the silica glasses of this invention containing terbium oxide and cerium oxide is from about 5 to about 5000 rare earth atoms per million silicon atoms, and at least 5 terbium atoms per million silicon atoms.

Figure 4:
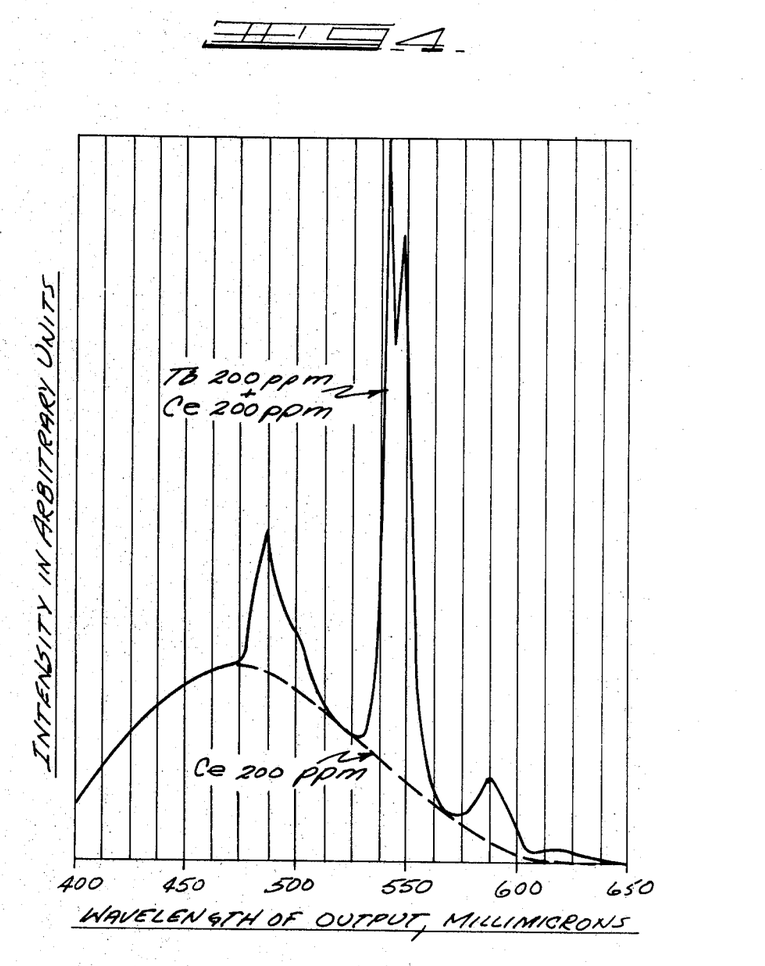

The unusual and unexpected enhancement of certain terbium emission wavelengths in the presence of cerium is shown in FIG. 4, which is a composite trace of the luminescence spectrum of a silica glass containing 200 cerium atoms per million silicon atoms, (lower curve), and the spectrum of a silica glass containing 200 terbium atoms and 200 cerium atoms per million silicon atoms (upper curve) excited by 3660 A. ultraviolet radiation; the abscissa units are nanometers. Terbium under similar excitation shows no spectrum when similarly measured, and as FIG. 4 shows, cerium in the absence of terbium shows relatively weak intensity luminescence, whereas glasses containing both show the relatively bright intensity spectrum characteristic of terbium shown as the upper trace in FIG. 4. The causes of this synergistic effect are unknown.

In particular, these principal wavelengths were observed in luminescence of the silica glasses of this invention containing oxides of the following rare earths; nm. represents nanometers, and the term in parentheses is an approximation of relatively intensity: terbium, 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.; terbium-dysprosium, 582 nm., 602 nm. (strong), 669 nm., 671 nm., 678 nm. (medium), 758 nm. (strong), 870 nm. (weak), 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.; terbium-holmium, 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.; terbium-erbium, 377 nm., 381 nm., 382 nm., 413 nm., 416 nm., 420 nm., 437 nm., 44 nm., 443 nm., 459 nm., 474 nm., 486 nm., 541 nm., 548 nm., 595 nm., 630 nm., 653 nm.; terbium-thulium, 458 nm., 461 nm., 464 nm. (strong), 787 nm., 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.; terbium-ytterbium, 986 nm. (medium), 1040 nm. (weak), 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.; terbium-lutetium, ca. 450 nm., 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., 653 nm.

Example 9

This example describes preparation of transparent, luminescent silica glasses containing terbium oxide and cerium oxide, and their use as luminescence targets.

The procedure of Example 6(A) was repeated, except that the aqueous terbium nitrate therein described was replaced with aqueous terbium nitrate and cerium nitrate in a concentration of solutes selected to provide 10 rare earth atoms per million silicon atoms; the product was a transparent, luminescent glass. The procedure of Examples 6(A)–(D) can also be adopted by suitable changes apparent to those skilled in the art to provide transparent, luminescent glasses of silica containing terbium and cerium oxides, wherein the number of rare earth atoms per million silicon atoms is from 5 to 5000, and the number of terbium atoms per million silicon atoms is at least 5. The glasses thus obtained show cathodoluminescence and photoluminescence: when bombarded with cathode rays they show light blue luminescence of medium intensity; when bombarded with 2537 A. ultraviolet radiation they show light blue luminescence of medium intensity; when bombarded with 3660 A. ultraviolet radiation they show light blue luminescence of bright intensity. Fibers drawn from these glasses by conventional means gave similar results. In particular, luminescence spectra of these glasses show an underlying continuum from about 410 nm. to about 600 nm., attributable to cerium, with superimposed maxima at 377 nm., 381 nm., 383 nm., 413 nm., 416 nm., 420 nm., 437 nm., 440 nm., 443 nm., 459 nm., 474 nm., 486 nm., 541 nm., 548 nm., 595 nm., 630 nm., and 653 nm., attributable to terbium.

As previously discussed, spectra of these glasses compared with those of silica glasses similarly prepared but containing terbium but not cerium or cerium but not terbium at the same concentrations show decreased intensity of luminescence attributable to cerium and an increased intensity of certain wavelengths attributable to terbium, in particular the maxima at 486 nm., 541 nm., 548 nm., 595 nm., 630 nm., and 653 nm.

Although the examples hereof have been directed toward the use of certain rare earth oxides, it will be obvious to those skilled in the art that other rare earth oxide combinations can be used as well as other oxide ingredients, e.g. metal or metalloid oxides, including both luminescent and non-luminescent activators.

The particular non-luminescent activator will depend upon the specific glass characteristics desired. Thus if one selects an oxide of cobalt (alone or in combination with other oxide ingredients), the resulting glass (prepared in accordance with this invention) will have high temperature stability, low thermal expansion, unique filter properties, and unique sonic properties (for use in delay lines).

In preparing the mixture of silica and the oxide ingredient(s), the oxide may be used or it may be prepared by oxidation or hydrolysis as described hereinbefore. When the latter technique is used, any source of the oxide cation can be used providing such source can be dissolved in a liquid suitable for wetting colloidal or otherwise finely divided silica and subsequently precipitated onto the silica where it can be made to remain during the sintering and coalescing steps of the process without objectionable chemical changes, e.g. such as the release of gas due to a change of valence.

It will be evident that modifications of this invention can be made without departing from the spirit and scope of this disclosure or the scope of the following claims.

We claim:

1. A process for preparing a substantially transparent, uniformly coalesced, homogeneous, luminescent glass which comprises uniformly compacting a homogeneous mixture of finely-divided, particulate, substantially pure, non-crystalline silica and at least one rare earth oxide, the number of rare earth atoms per million atoms of silicon ranging from about 5 to about 5000, and heating the compacted mixture under vacuum at a temperature of about 1000° C. to about 1750° C. for about one minute to about twenty-four hours so as to obtain coalescence thereof.

2. The process of claim 1 wherein the rare earth oxide is La and at least one member selected from Ce, Pr, Nd, Sm, Eu, Gd, Tb, Dy, Tm, Yb, and Lu.

3. The process of claim 1 wherein the rare earth oxide is Ce and at least one member selected from Pr, Nd, Sm, Eu, Gd, Tb, Dy, Ho, Er, Tm, Yb, and Lu.

4. The process of claim 1 wherein the rare earth oxide is Pr and at least one member selected from Nd, Sm, Eu, Gd, Tb, Dy, Ho, Er, Tm, Yb, and Lu.

5. The process of claim 1 wherein the rare earth oxide is Nd and at least one member selected from Sm, Eu, Gd, Tb, Dy, Ho, Er, Tm, Yb, and Lu.

6. The process of claim 1 wherein the rare earth oxide is Sm and at least one member selected from Eu, Gd, Tb, Dy, Ho, Er, Tm, Yb, and Lu.

7. The process of claim 1 wherein the rare earth oxide is Eu and at least one member selected from Gd, Tb, Dy, Ho, Er, Tm, Yb, and Lu.

8. The process of claim 1 wherein the rare earth oxide is Gd and at least one member selected from Tb, Dy, Ho, Er, Tm, Yb, and Lu.

9. The process of claim 1 wherein the rare earth oxide is Tb and at least one member selected from Dy, Ho, Er, Tm, Yb, and Lu.

10. The process of claim 1 wherein the rare earth oxide is Dy and at least one member selected from Ho, Er, Tm, Yb, and Lu.

11. The process of claim 1 wherein the rare earth oxide is Ho and at least one member selected from Tm, Yb, and Lu.

12. The process of claim 1 wherein the rare earth oxide is Er and at least one member selected from Tm, Yb, and Lu.

13. The process of claim 1 wherein the rare earth oxide is Tm and at least one member selected from Yb and Lu.

14. The process of claim 1 wherein the rare earth oxide is Yb and Lu.

References Cited

UNITED STATES PATENTS

| 2,268,589 | 1/1942 | Heany | 65—62 |
| 2,958,604 | 11/1960 | George | 106—52 |
| 3,311,773 | 3/1967 | Turner. | |

OTHER REFERENCES

Pringsheim: Fluorescence and Phosphorescence (1949), p. 507.

TOBIAS E. LEVOW, Primary Examiner

R. D. EDMONDS, Assistant Examiner

U.S. Cl. X.R.

65—32; 106—52